US011609674B2

(12) United States Patent
Deng et al.

(10) Patent No.: US 11,609,674 B2
(45) Date of Patent: Mar. 21, 2023

(54) METHOD FOR INTERFACE OPERATION AND TERMINAL, STORAGE MEDIUM THEREOF

(71) Applicant: GUANGDONG OPPO MOBILE TELECOMMUNICATIONS CORP., LTD., Guangdong (CN)

(72) Inventors: Junjie Deng, Guangdong (CN); Runda Dai, Guangdong (CN)

(73) Assignee: GUANGDONG OPPO MOBILE TELECOMMUNICATIONS CORP., LTD.

( * ) Notice: Subject to any disclaimer, the term of this patent is extended or adjusted under 35 U.S.C. 154(b) by 0 days.

(21) Appl. No.: 17/396,484

(22) Filed: Aug. 6, 2021

(65) Prior Publication Data
US 2021/0365160 A1 Nov. 25, 2021

Related U.S. Application Data

(63) Continuation of application No. PCT/CN2021/074673, filed on Feb. 1, 2021.

(30) Foreign Application Priority Data

Apr. 9, 2020 (CN) .......................... 202010273520.5

(51) Int. Cl.
*G06F 3/0481* (2022.01)
*G06F 3/041* (2006.01)
*G06F 3/0488* (2022.01)

(52) U.S. Cl.
CPC .......... *G06F 3/0481* (2013.01); *G06F 3/0412* (2013.01); *G06F 3/0488* (2013.01);
(Continued)

(58) Field of Classification Search
CPC .... G06F 3/0481; G06F 3/0412; G06F 3/0416; G06F 3/0488; G06F 2203/04105;
(Continued)

(56) References Cited

U.S. PATENT DOCUMENTS

| 2011/0169749 | A1* | 7/2011 | Ganey | .................. G06F 1/1626 |
| | | | | 345/173 |
| 2013/0237288 | A1* | 9/2013 | Lee | ....................... G06F 3/0482 |
| | | | | 455/566 |
| 2014/0040826 | A1 | 2/2014 | Wei et al. | |
| 2014/0184503 | A1 | 7/2014 | Jang et al. | |

(Continued)

FOREIGN PATENT DOCUMENTS

| CN | 102129312 A | 7/2011 |
| CN | 102855056 A | 1/2013 |

(Continued)

OTHER PUBLICATIONS

International Search Report and the Written Opinion dated May 8, 2021 from the International Searching Authority Re. Application No. PCT/CN2021/074673.

(Continued)

*Primary Examiner* — Rodney Amadiz
(74) *Attorney, Agent, or Firm* — Adsero IP

(57) ABSTRACT

The present disclosure relates to an interface operation method, terminal, and storage medium. The interface operation method includes: receiving a touch operation in a target touch area of the touch display screen; acquiring an interaction area with at least one target functional element in a current interface, wherein the interaction area is an area of the touch display screen outside the target touch area; and mirroring the interaction area at the target touch area in the current interface. In the single-handed operation mode, the terminal can mirror the interaction area with at least one functional element at the target touch area.

17 Claims, 16 Drawing Sheets

(52) U.S. Cl.
CPC ............ *G06F 2203/04105* (2013.01); *G06F 2203/04806* (2013.01)

(58) Field of Classification Search
CPC ............ G06F 2203/04806; G06F 2203/04805; G06F 3/04886; G06F 3/0482; G06F 3/0484; G06F 2203/04803
See application file for complete search history.

(56) References Cited

U.S. PATENT DOCUMENTS

| | | | |
|---|---|---|---|
| 2014/0351761 A1* | 11/2014 | Bae | G06F 3/017 715/835 |
| 2015/0169141 A1* | 6/2015 | Kim | G06F 3/0482 715/769 |
| 2016/0253076 A1 | 9/2016 | Lee | |
| 2017/0300227 A1 | 10/2017 | Wang et al. | |

FOREIGN PATENT DOCUMENTS

| | | |
|---|---|---|
| CN | 102880399 A | 1/2013 |
| CN | 103677556 A | 3/2014 |
| CN | 104049859 A | 9/2014 |
| CN | 105183277 A | 12/2015 |
| CN | 109218518 A | 1/2019 |
| CN | 110275658 A | 9/2019 |
| CN | 110456954 A | 11/2019 |
| CN | 105094654 B | 2/2020 |
| CN | 107193469 B | 3/2020 |
| CN | 111026480 A | 4/2020 |
| CN | 111427505 A | 7/2020 |
| JP | 6380341 B2 | 8/2018 |
| KR | 20150039293 A | 4/2015 |
| WO | 2017032063 A1 | 3/2017 |

OTHER PUBLICATIONS

The First Office Action dated Jun. 29, 2022 from Chinese patent Application No. 202010273520.5.

The supplementary European search report dated Sep. 13, 2022 from European patent Application No. 21784135.7.

The supplementary European search report dated Sep. 13, 2022 from European patent Application No. 21784185.7.

* cited by examiner

METHOD FOR INTERFACE OPERATION AND TERMINAL, STORAGE MEDIUM THEREOF

CROSS-REFERENCE TO RELATED APPLICATION

This application is a continuation of International Patent Application No. PCT/CN 2021/074673, filed on Feb. 1, 2021, which claims priority to Chinese Patent Application No. 202010273520.5, filed on Apr. 9, 2020, both of which are herein incorporated by reference in their entirety.

TECHNICAL FIELD

The present disclosure relates to the field of terminal, and more particular to method, terminal and storage medium for interface operation.

BACKGROUND

With the rapid development of terminal technology, more and more users prefer terminals with large touch screens. The large touch screen can provide users with a rich visual experience. For example, when users watch pictures and movies using a terminal with a larger touch screen, a clear and smooth visual experience can be served.

SUMMARY

Embodiments of the present disclosure provide an interface operation method, terminal, and storage medium, in order to improve the convenience of man-machine interaction operations.

According to the first aspect, embodiments of the present disclosure provide a terminal comprising a processor, a touch display screen, a memory for storing program instructions, wherein when the program instructions are executed by the processor, the processor is configured to:
receive a touch operation in a target touch area of the touch display screen;
acquire an interaction area with at least one target functional element in a current interface, wherein the interaction area is an area of the touch display screen outside the target touch area; and mirror the interaction area at the target touch area in the current interface.

According to the second aspect, embodiments of the present disclosure provide a method for interface operation, applicable to a mobile terminal having a touch display screen, the method comprising:
receiving a touch operation in a target touch area of the touch display screen;
acquiring an interaction area with at least one target functional element in a current interface, wherein the interaction area is an area of the touch display screen outside the target touch area; and mirroring the interaction area at the target touch area in the current interface.

According to the third aspect, embodiments of the present disclosure provide a computer-readable storage medium having at least one instruction stored thereon, and when the at least one instruction is executed by the processor, the terminal will implement the method of interface operation according to the second aspect.

BRIEF DESCRIPTION OF THE DRAWINGS

In order to explicitly illustrate technical solutions in embodiments of the present disclosure, a brief introduction for the accompanying drawings used when describing the embodiments will be made as follows. Apparently, the drawings described below are only corresponding to some embodiments of the present disclosure, and those skilled in the art may obtain other drawings according to these drawings without creative labor.

DETAILED DESCRIPTION

Due to the large size of the terminal touch screen, it is difficult for users to touch some areas on the touch screen when operating with one hand. Therefore, users need to move the terminal position in the palm frequently, resulting in inconvenience for users to operate.

To make the objectives, technical solutions, and advantages of the present disclosure clearer, the following describes embodiments of the present disclosure in further detail with reference to the accompanying drawings. Apparently, the embodiments described below are only corresponding to some embodiments of the present disclosure, and those skilled in the art may obtain other embodiments according to these drawings without creative labor.

Figure 1:
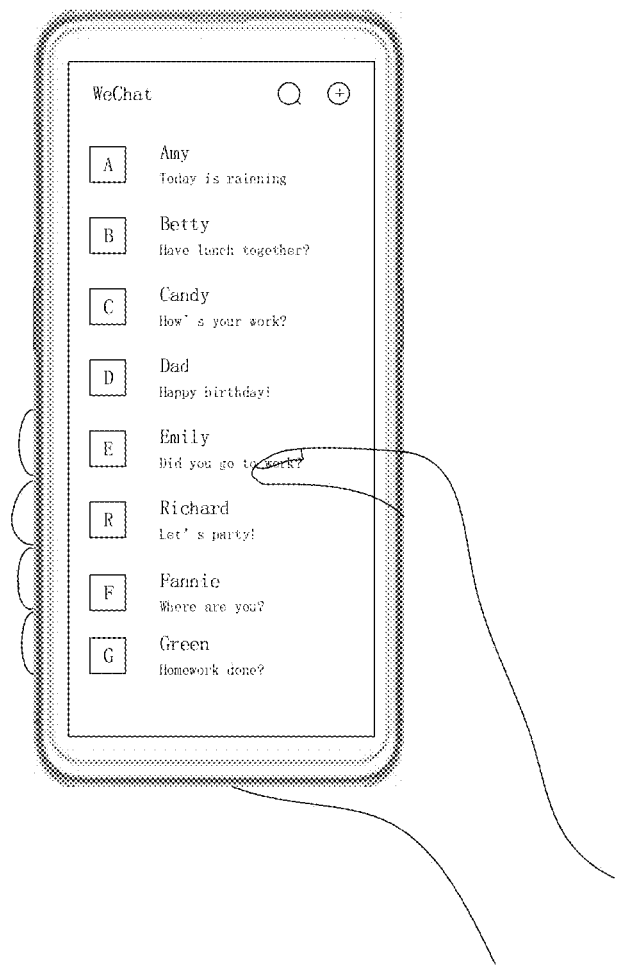
FIG. 1 is a schematic diagram of an application scenario of an interface operation method or interface operation device applied to an embodiment.
Figure 2:
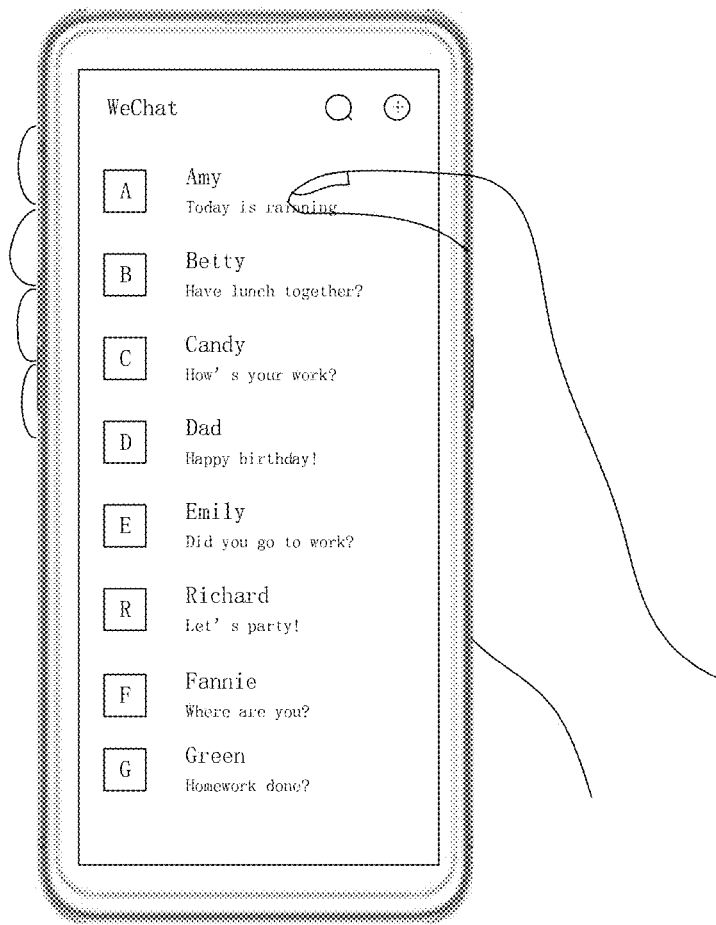
FIG. 2 is an example schematic diagram of a terminal interface according to an embodiment.

FIG. 1 is a schematic diagram of an application scenario of an interface operation method or an interface operation device applied to an embodiment of the present disclosure. As shown in FIG. 1, when a user uses WeChat to communicate with other users, the user can click the search button to get the communication partner. However, due to the large size of the terminal display screen, it is difficult for the user to touch the search button on the WeChat display interface when the user performs operations on the display screen with one hand. Therefore, as shown in FIG. 2, when the user operates with one hand, the user needs to move the terminal in the palm of the hand to touch the search button on the WeChat display interface. Since some areas are difficult to touch when operating the touch screen with one hand, the user needs to frequently move the position of the terminal in the palm of the hand, which is inconvenient to operate and may lead to the risk of the terminal falling.

In related art, the user can set the one-handed mode. When the one-handed mode is used, the interface can be triggered to be proportionally reduced. At this time, the display content on the interface will also be proportionally reduced, which is easy to cause misoperation. In addition, users can also click on the floating ball on the interface to make a cursor appear at the top of the interface and map corresponding operations, such as move, click, and long press. The user needs to click the floating ball on the interface and map the corresponding operation according to the cursor that appears at the top of the interface. The operation is complicated, which makes the user's one-handed operation not convenient.

Hereinafter, the interface operation method provided by the embodiment of the present disclosure will be introduced in detail with reference to FIG. 3 to FIG. 14. The execution subjects of the embodiments are shown in FIG. 3 to FIG. 14 may be, for example, a terminal.

Figure 3:
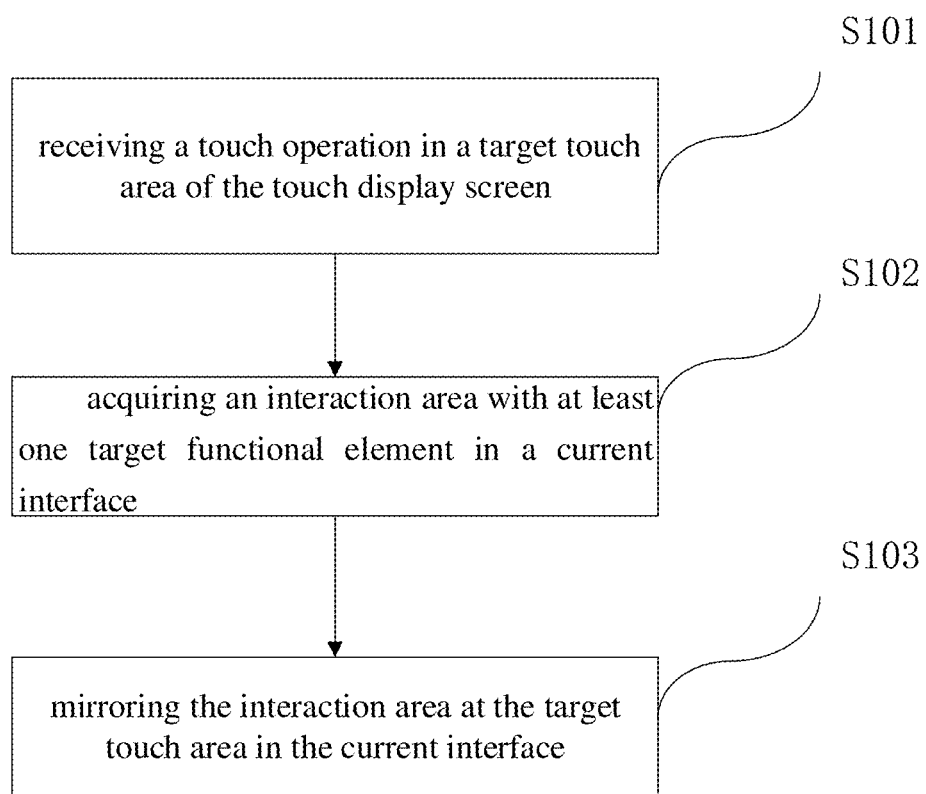
FIG. 3 is a schematic flowchart of an interface operation method according to an embodiment.

Refer to FIG. 3, an interface operation method according to an embodiment is illustrated.

At block S101, the terminal receives a touch operation in a target touch area of the touch display screen.

According to some embodiments, the touch display screen also known as a "touch display panel". The touch display screen provides a simple, convenient, and natural way of human-computer interaction. When the terminal detects that the user touches an icon on the touch display screen, the terminal can trigger the corresponding connection device according to the position of the icon and display the corresponding interface on the touch display screen.

Figure 4:
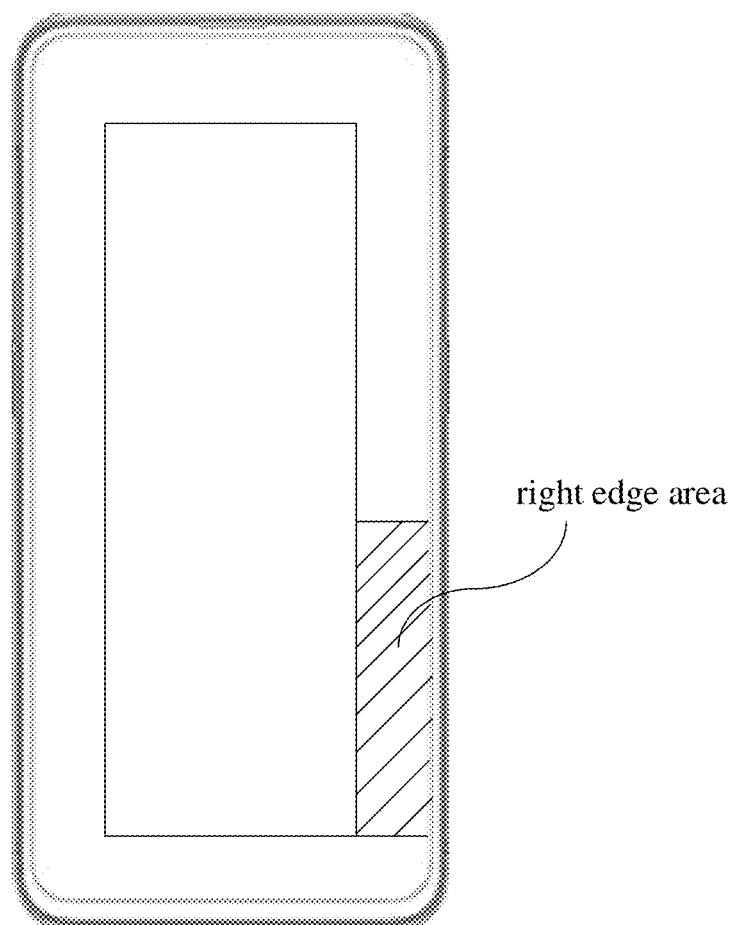
FIGS. 4 to 7 is an example schematic diagram of a terminal interface according to an embodiment.

It is easy to understand that the target touch area can be any area on the touch display screen, for example, in some embodiments, an edge area of the touch display screen, which refers to the display area within a certain distance from the edge of the touch display screen, and the edge area includes but is not limited to the left edge area, the right edge area, the upper edge area, and the lower edge area of the display screen. The edge area of the touch display screen may be preset according to the size of the touch display screen, or may be set by the user according to his own habits. The edge area of the embodiment may be set by the user according to his own needs, for example, the edge area may be as shown in FIG. 4, for example. When the user operates with the right hand, the edge area of the touch display screen may be the right edge area. The target touch area also can be defined by the touch operation.

Optionally, the touch operation includes, but is not limited to, a pressing operation, a sliding operation, and so on. The pressing operation may be a heavy pressing operation, a light pressing operation, a light tap operation, etc. The light pressing operation includes, but is not limited to, a single click operation, a double click operation, and the like. The sliding operation may be, for example, an operation for sliding according to a preset sliding track, or an operation for sliding according to a preset direction.

According to some embodiments, the edge area of the touch display screen may be provided with a pressure sensor. When the user touches the edge area, the terminal can receive the touch input on the edge area of the touch screen through the pressure sensor, and collect the touch pressure value, the touch position or the touch trajectory, etc. The touch operation in the embodiment of the present disclosure may be, for example, a heavy press operation. As shown in FIG. 4, when the terminal detects that the user touches the right edge area of the touch screen through the terminal's display pressure sensor, the terminal can receive the user's press operation in the right edge area of the touch screen, and obtain the pressure corresponding to the press position.

At block S102, the terminal acquires interaction area with at least one target functional element in a current interface.

According to some embodiments, the current interface refers to the interface displayed on the touch display screen of the terminal when the terminal receives a touch operation. The interface may include a plurality of different functional elements, for example. The functional elements may be elements displayed on the interface, such as icons, controls, widgets, or elements such as display list. It is easy to understand that some of the functional elements provide interaction function to the user. For example, the interface may be a displayed interface after opening WeChat, the display interface may include a chat list for communicating with multiple different users. In some other embodiments, the display interface may be an interface of other applications, or a display interface including multiple applications.

Figure 5:
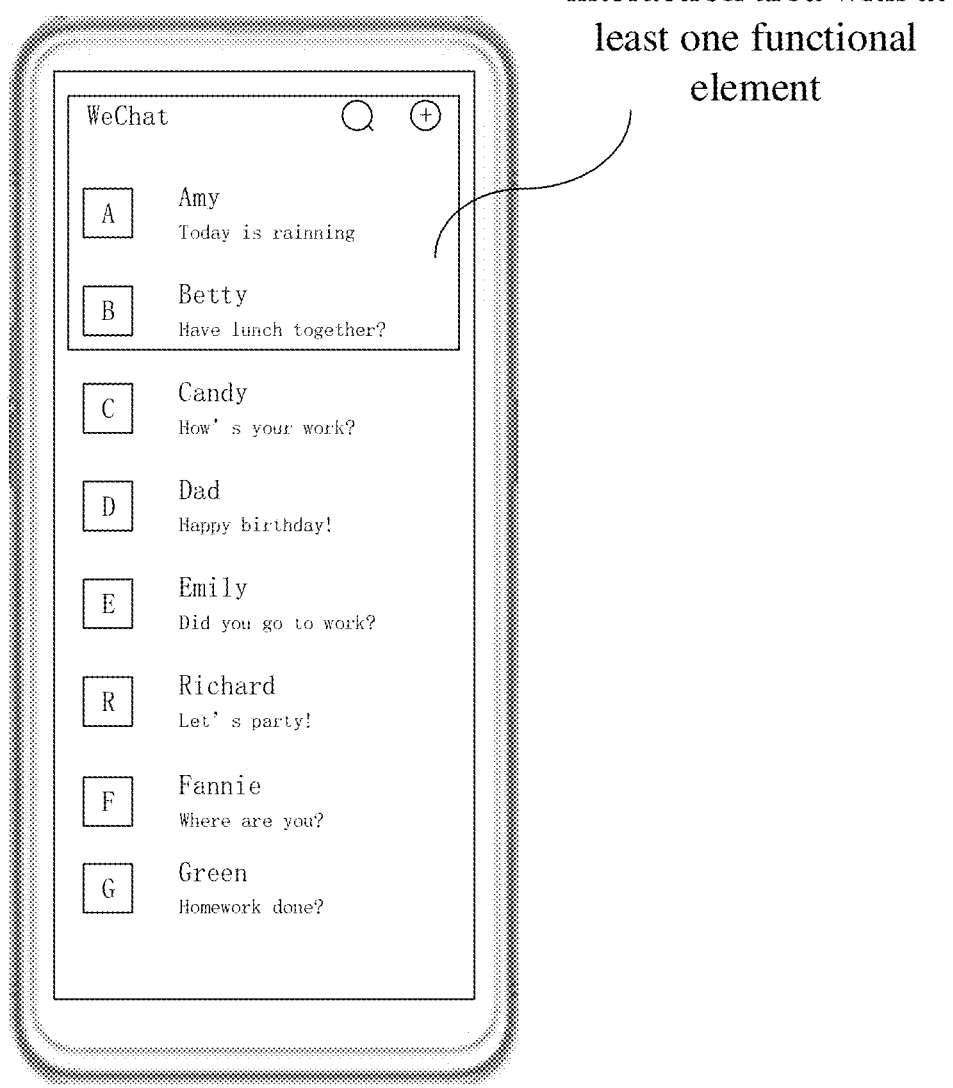

In some embodiments, after the terminal receives the touch operation, the terminal can obtain the interaction area including at least one functional element in the current interface. The interaction area refers to an area that is difficult to touch when the user operates with one hand, or the interaction area includes an area on the display screen outside the target touch area. In some embodiments, the interaction area may be far away from the user's holding position or the touch position of the touch operation; while the target touch area may be easy to touch when the user operates with one hand. In some embodiments, the interaction area lies on a part of the touch display screen far away from the holding position of the user. The interaction area can be, for example, the area where the search widget and add widget are located after opening WeChat. The interaction area can also be, for example, the area where the chat control with user A in the chat list of multiple different users displayed on the WeChat interface, as depicted in FIG. 5. For example, it can also be the area where the background image of the WeChat Moments display interface is located.

Optionally, for example, when the terminal detects that the user touches the right edge area through the pressure sensor, the terminal receives the press operation by the user in the right edge area of the touch screen, and obtains the pressing position corresponding to the pressing operation. The interaction area including at least one functional element in the current interface is obtained by the terminal, for example, as shown in FIG. 5. The interaction area may be, for example, an area determined by the terminal based on preset size information, and/or the interaction area may be determined by the terminal based on an area that cannot be touched by a user's one-handed operation.

According to some embodiments, when the terminal is in the portrait mode, if the user uses the left hand to operate, the user can touch the left area of the screen with one hand. At this time, the interaction area including at least one functional element acquired by the terminal may be, for example, the right side area of the screen. When the terminal is in the landscape mode, if the user uses the left hand to operate, the user can touch the upper area of the screen with one hand, for example, the interaction area including at least one functional element acquired by the terminal at this time can be, for example, the lower area of the screen.

At block S103, the terminal mirrors the interaction area at the target touch area in the current interface.

According to some embodiments, mirroring is a type of redundancy, making an identical copy of data or image can be interpreted as the process of mirroring. The process of mirroring the interaction area at the target touch area in some embodiments of the present disclosure includes, but is not limited to, operations such as creating a mirror file, editing the mirror file, or performing format conversion on the mirror file.

It is easy to understand that when the terminal mirrors the interaction area, the terminal can directly mirror the interaction area at the target touch area of the currently displayed interface, the terminal can also generate a floating window at the target touch area, and display the interaction area on the floating window. In some embodiments, the terminal mirrors the interaction area at the touch position of the touch operation, so the user can easily access the functional elements far from the touch position at the touch position.

Optionally, when the terminal obtains the interaction area, it can mirror the interaction area at the touch position of the current interface. When the terminal receives an operation on the interaction area, the terminal can respond to the operation synchronously in the interaction area and the mirrored interaction area.

Figure 6:
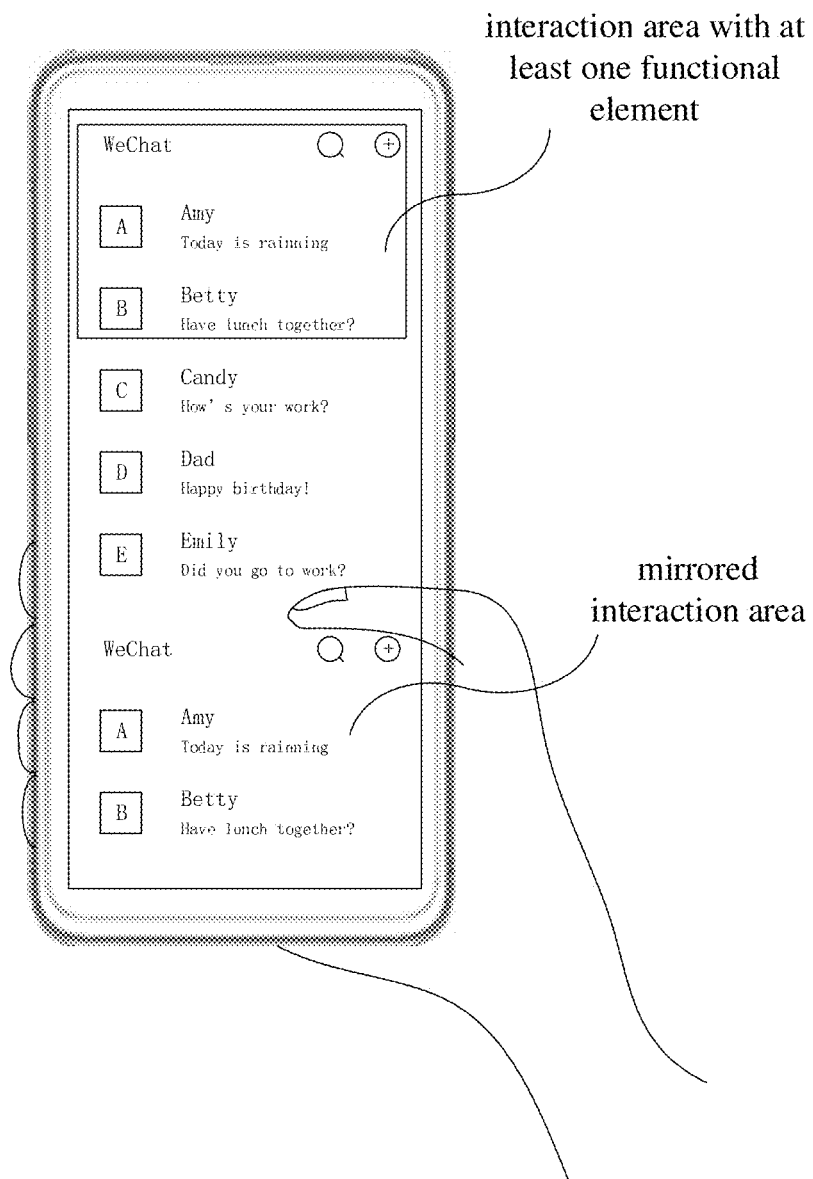
Figure 7:
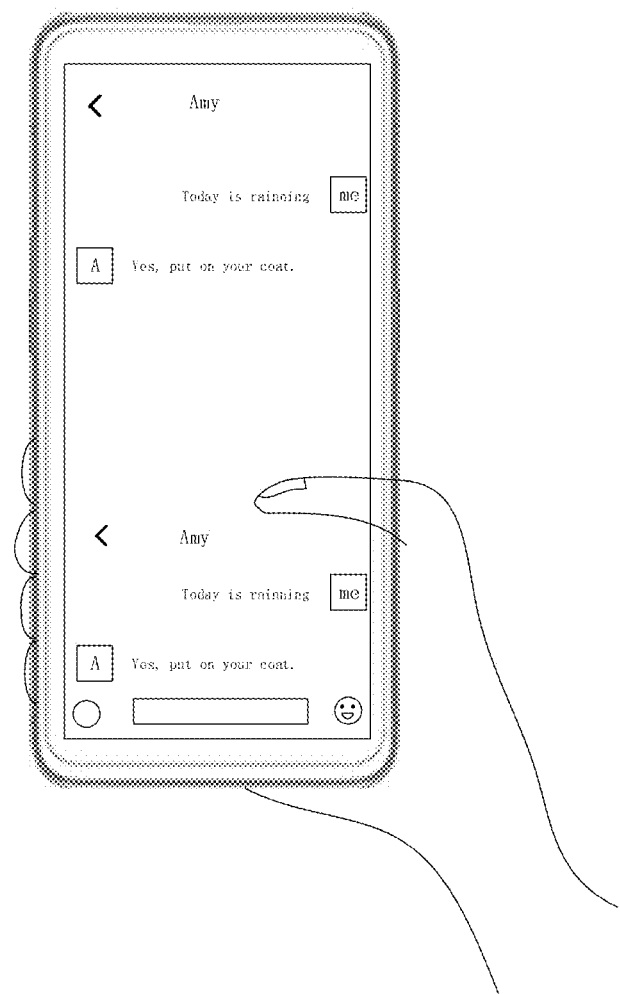

According to some embodiments, when the terminal acquires the interaction area as shown in FIG. 5, it can directly mirror the interaction area at the touch position on the screen, as shown in FIG. 6. When the terminal detects that the user clicks the chat control of User A, either in the function area or in the mirrored function area, the terminal can display the chat interface with User A in the mirrored function area. At this time, the terminal can also display the chat interface with User A on the primal interface of the full screen, as shown in FIG. 7.

The disclosed embodiment provides an interface operation method. When the terminal receives the touch operation by the user in the target touch area of the touch display screen, it can mirror the interaction area including at least one functional element at the target touch area, so that the user can operate the functional element in the mirrored interaction area at the target touch area. Therefore, in one-hand operating mode, the user can directly operate the functional elements in the region around the target touch area, without changing the proportion of the current display interface on the touch display screen. Also without frequently changing holding position in the palm of the terminal, the users can simplify the one-handed operation process and improve the convenience of one-handed operation.

Figure 8:
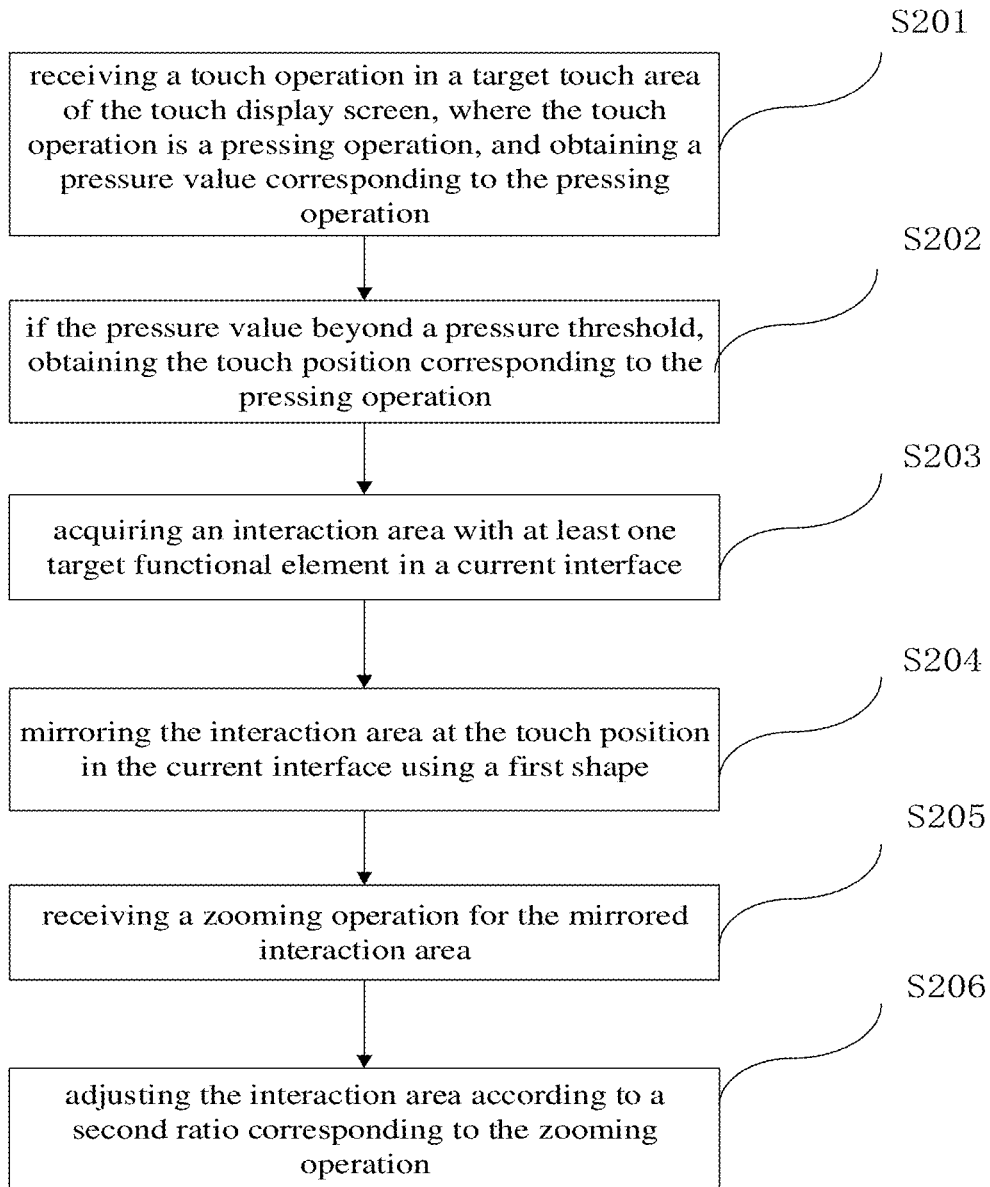
FIG. 8 is a schematic flowchart of an interface operation method according to another embodiment.

As shown in FIG. 8, the method of the embodiment of the present disclosure may begin at block S201.

At block S201, the terminal receives a touch operation in a target touch area of the touch display screen, where the touch operation is a pressing operation, and obtaining a pressure value corresponding to the pressing operation.

According to some embodiments, the press operation includes, but is not limited to, a heavy press operation, a light press operation, a light tap operation, etc. Wherein the light tap operation includes but is not limited to, a tap operation, a double-tap operation, and the like.

It is easy to understand that the touch display screen of the terminal is provided with a pressure sensor, where the position of the pressure sensor could be in the edge area of the touch screen or other area in the screen. For example, the position of the pressure sensor may be set in the edge area of the touch screen of the terminal, or may be set in the area where the pressure value can be collected. The area may be, for example, the four top corners of the touch screen.

Optionally, when the terminal receives a press operation input by the user in the edge area of the touch screen, the terminal may use pressure-sensing technology to obtain the pressure value corresponding to the press operation. The position of the pressure sensor may be set in the edge area of the touch screen, for example. When the terminal receives the press operation input by the user in the right edge area of the touch screen, the terminal obtains the pressure value corresponding to the press operation through the pressure sensor. According to some embodiments, usually, when the user is operating the display interface, lightly pressing the functional elements on the display interface can realize the functions of interface switching, information input, and pop-up function list selection. In the embodiments of the present disclosure, taking heavily press operation on the edge area of touch screen as an example way of activating the one-handed mode for description.

At block S202, if the pressure value beyond a pressure threshold, the terminal obtains the touch position corresponding to the pressing operation.

According to some embodiments, when the terminal obtains the pressure value corresponding to the pressing operation, the terminal may compare the obtained pressure value with a pressure threshold. When the pressure value is greater than the pressure threshold, it is determined that the pressing operation is a heavy pressing operation, and the terminal may obtain the touch position corresponding to the pressing operation. When the terminal acquires that the pressure value is less than the pressure threshold, it is determined that the pressing input is a light pressing operation, and the terminal can respond to the corresponding operation of the light pressing operation.

It is easy to understand that the terminal may obtain the pressing position corresponding to the pressing operation based on the pressure sensor, and the terminal may also obtain the pressing position corresponding to the pressing operation based on the fingerprint sensor.

At block S203, the terminal acquires an interaction area with at least one target functional element in a current interface.

Figure 9:
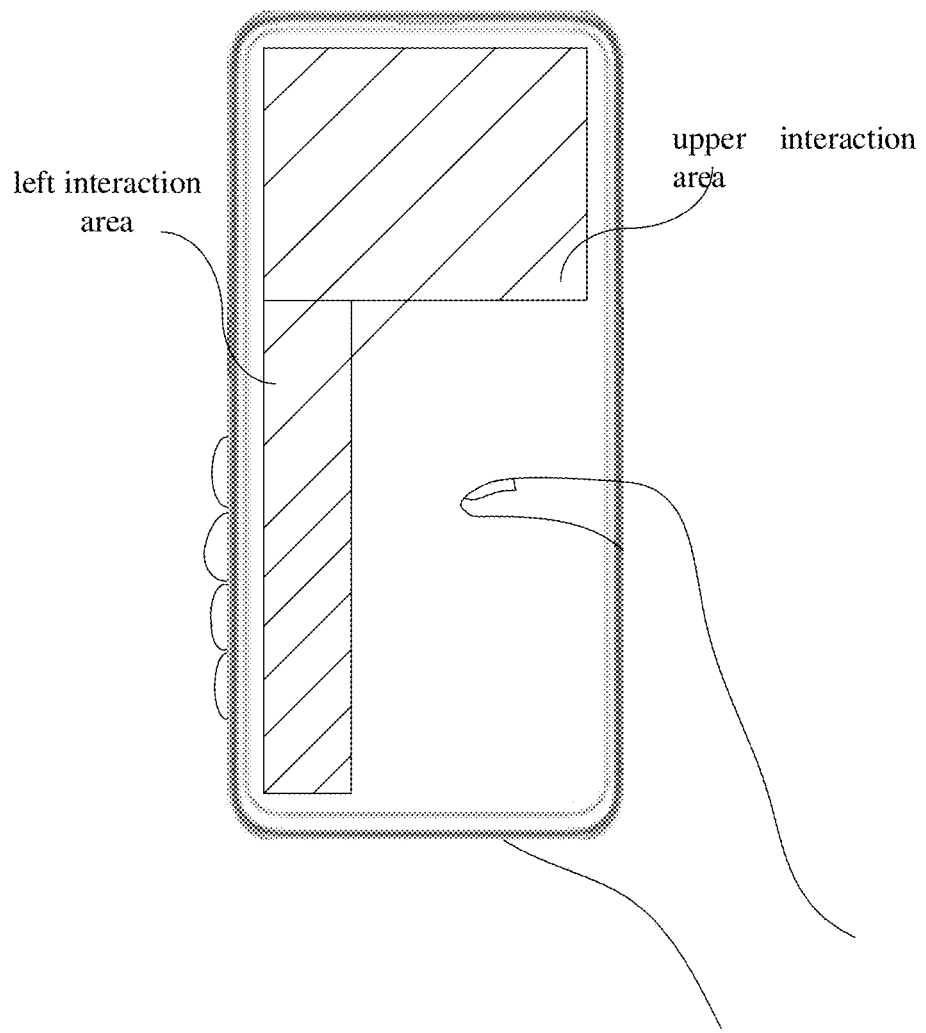
FIG. 9 is an example schematic diagram of a terminal interface according to another embodiment.
Figure 10:
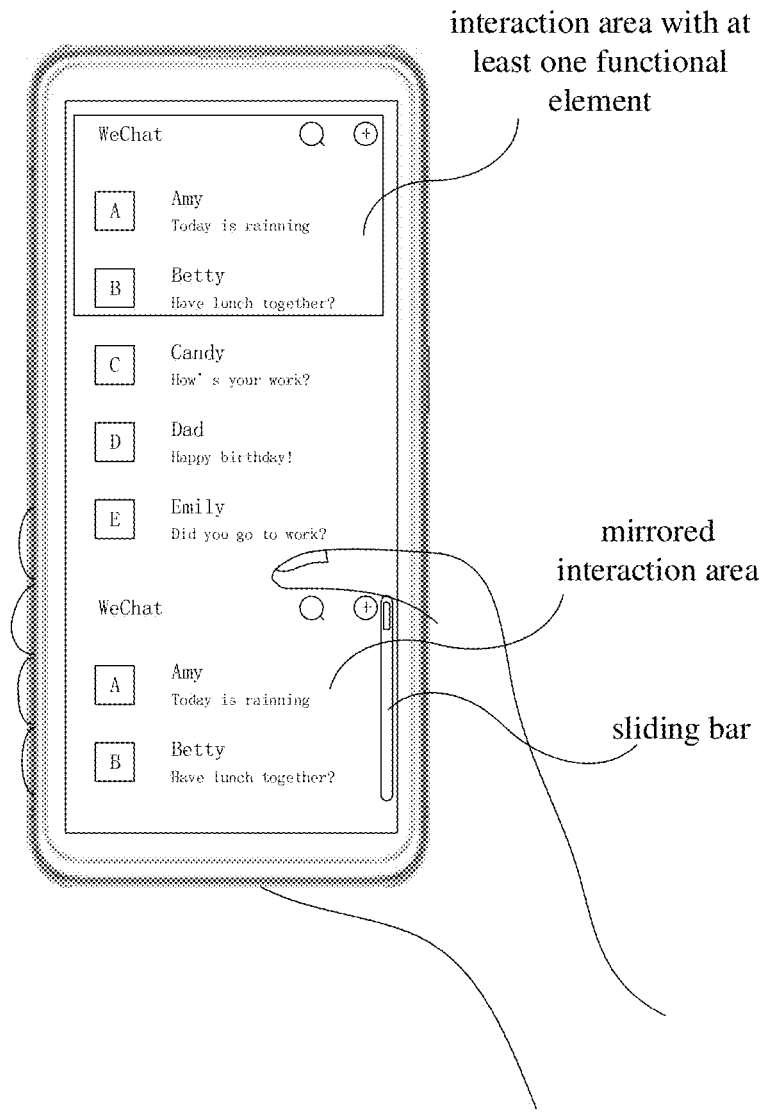
FIG. 10 is an example schematic diagram of a terminal interface according to another embodiment.

According to some embodiments, when the terminal obtains the pressing position corresponding to the pressing operation, the terminal can determine the interaction area in which the functional element is located in the currently displayed interface. The interaction area is determined by the terminal refers to an area that is difficult to touch when the user operates with one hand. The interaction area is an area of the touch display screen outside the target touch area, or it may include an area on the touch display screen that is far away from the user's holding position. For example, when the user uses the right hand to perform a one-handed operation, the interaction area is determined by the terminal may be, for example, the upper interaction area and the left interaction area of the touch display screen, the terminal interface may be as shown in FIG. 9.

At block S204, the terminal mirrors the interaction area at the touch position in the current interface using a first shape.

According to some embodiments, the first shape includes, but is not limited to, rectangle, square, circle, ellipse, triangle, and so on. The first shape may be set when the terminal leaves the factory, or set by the user according to his own habits.

It is easy to understand that when the terminal determines the interaction area, the terminal can use a first shape to mirror the interaction area at the target touch area in the current interface. More specifically, the terminal may intercept the interaction area with a first shape and then mirror the intercepted interaction area. For example, the terminal may adopt an oval shape to intercept the interaction area. In some embodiments, the terminal may perform zoom processing on the intercepted interaction area before mirroring according to a preset ratio. For example, in order to improve the display effect of the mirrored interaction area of the terminal, or simplify the user's interface operation process, the terminal may perform zooming processing on the intercepted interaction area according to a preset ratio. The preset ratio in the embodiment of the present disclosure may be 2:1, for example. When the terminal adopts an oval shape to intercept the interaction area, the terminal can reduce the interaction area at a ratio of 2:1. It is easy to understand that when the terminal adopts a preset shape to intercept the interaction area, the terminal can also zoom in/out the intercepted interaction area based on the size information of the intercepted interaction area and the size information of the mirroring area, wherein the size information of the mirroring area may be preset in the terminal or set by the user. Then, the terminal mirrors the zoomed intercepted interaction area at the touch position. According to some embodiments, after the terminal performs zoom in/out processing on the intercepted interaction area according to a preset ratio, the terminal may mirror the zoomed intercepted interaction area at the touch position. For example, after the terminal zooms out the intercepted interaction area at a ratio of 2:1, the terminal can mirror the reduced interaction area at the touch position. At this time, the user can operate the target functional element in the interaction area mirrored at the touch position.

It is easy to understand that when the terminal mirrors the interaction area including at least one functional element at the touch position, the terminal can set a sliding bar in the mirrored area, and the sliding bar can be determined based on the number of functional elements and the size information of the mirroring area. For example, when the terminal mirrors the interaction area according to a preset ratio, and the number of functional elements is greater than a preset threshold, the terminal cannot display all the functional elements of the interaction area in the mirroring area corresponding to the touch position. At this time, the terminal may set a sliding bar in the mirroring area, so that the user can operate the target functional elements by controlling the sliding bar, the terminal interface may be shown in FIG. 10.

Figure 11:
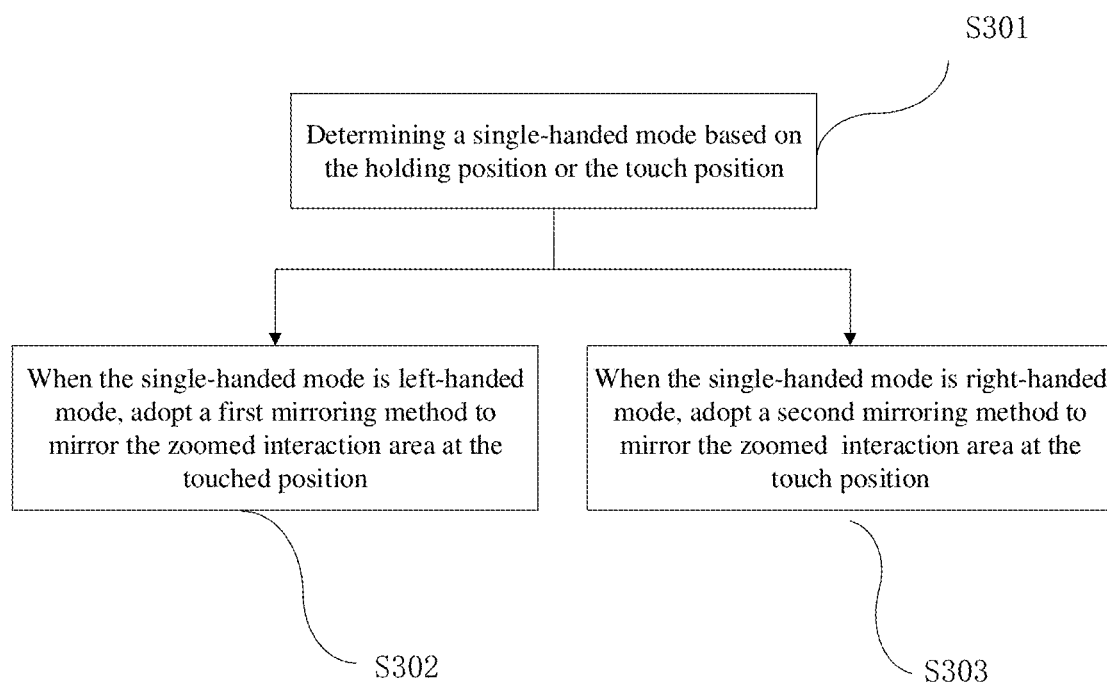
FIG. 11 is an example schematic diagram of a terminal interface according to another embodiment.

According to some embodiments, refer to FIG. 11, which provides a schematic flowchart of an interface operation method according to an embodiment of the present disclosure. As shown in FIG. 11, the method of the embodiments of the present disclosure are illustrated.

At block S301, the terminal determines a one-handed mode based on the holding position, or the touch position. At block S302, when the one-handed mode is the left-handed mode, the terminal adopt a first mirroring method to mirror the zoomed interaction area at the target touch area. At block S303, when the one-handed mode is the right-handed mode, the terminal adopt a second mirroring method to mirror the zoomed interaction area at the target touch area.

It is easy to understand that when the terminal obtains the holding positon or touch position of the user, the terminal can detect if the terminal is in the one-handed mode. The one-handed mode includes a left-handed mode or a right-handed mode. The holding position or the touch position acquired by the terminal may also be, for example, the side of the terminal. The side surface of the terminal may be provided with a pressure sensor or a light sensor. When the sensor provided on the side of the terminal is a light sensor, when the user's hand holds the terminal, the light sensor on the side of the terminal can obtain light-blocking information. The terminal can determine the one-handed mode based on the occlusion information of the light sensor.

Optionally, when the terminal determines that the one-handed mode is the left-handed mode, the terminal may use the first mirroring mode to mirror the zoomed interaction area. For example, when the search control in the interaction area acquired by the terminal is set in the upper right corner of the interaction area, the first mirroring method is used to mirror the zoomed interaction area at the target touch position to set the search control in the upper left corner of the zoomed interaction area.

Optionally, when the terminal determines that the single-handed mode is the right-handed mode, the terminal may use the second mirroring mode to mirror the zoomed interaction area. For example, when the search control in the interaction area acquired by the terminal is set in the upper right corner of the interaction area, the second mirroring method is used to mirror the zoomed interaction area at the target touch area. The search control can be set in the lower right corner of the zoomed interaction area or in the upper right corner of the zoomed interaction area.

Figure 12:
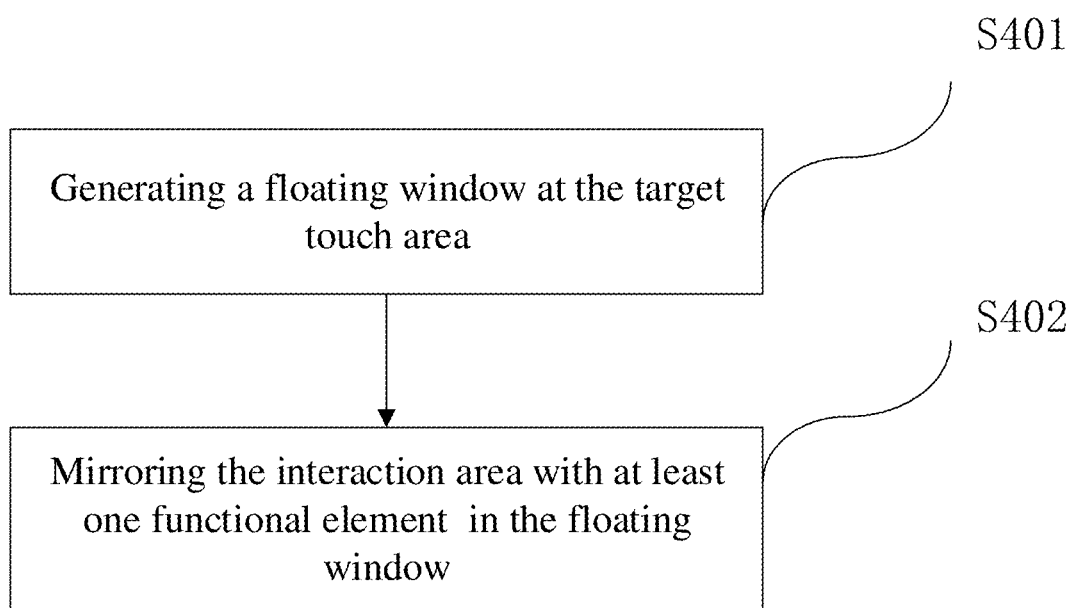
FIG. 12 is an example schematic diagram of a terminal interface according to another embodiment.

According to some embodiments, please refer to FIG. 12, which provides a schematic flowchart of an interface operation method for an embodiment of this disclosure. As shown in FIG. 12, the method of some embodiment of the present disclosure is illustrated. At block S401, the terminal generates a floating window at the target touch area. At block S402, the terminal mirrors the interaction area with at least one functional element in the floating window.

It is easy to understand that when the terminal obtains the interaction area including at least one functional elements of the current interface, the terminal can generate a floating window at the target touch area. The size information of the floating window may be set before the terminal leaves the factory, or set by the user according to his own habits. The shape of the floating window can be designed in any shape.

Figure 13:
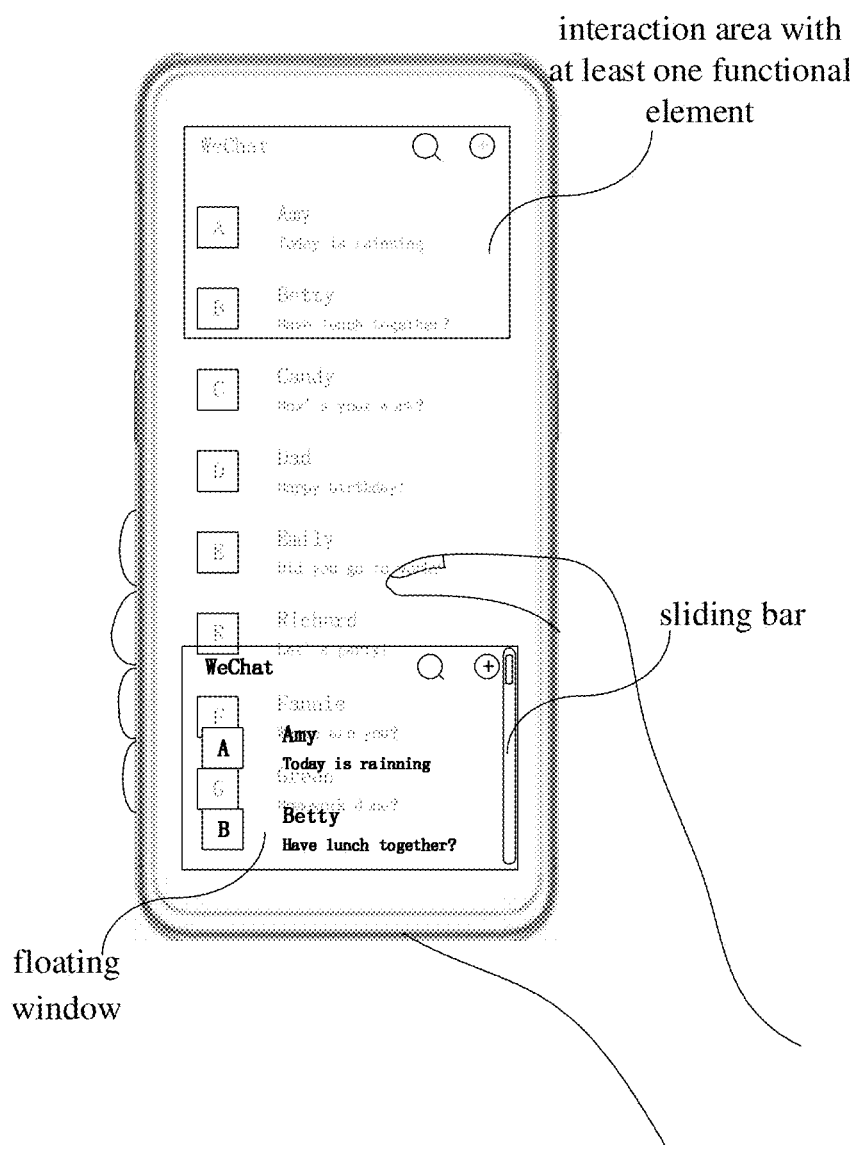
FIG. 13 is an example schematic diagram of a terminal interface according to another embodiment.

Optionally, when the terminal generates a floating window at the target touch area, the terminal may mirror the interaction area in the floating window. At this time, the display interface of the terminal may be as shown in FIG. 13. The user can operate the target functional element on the floating window of the terminal.

Figure 14:
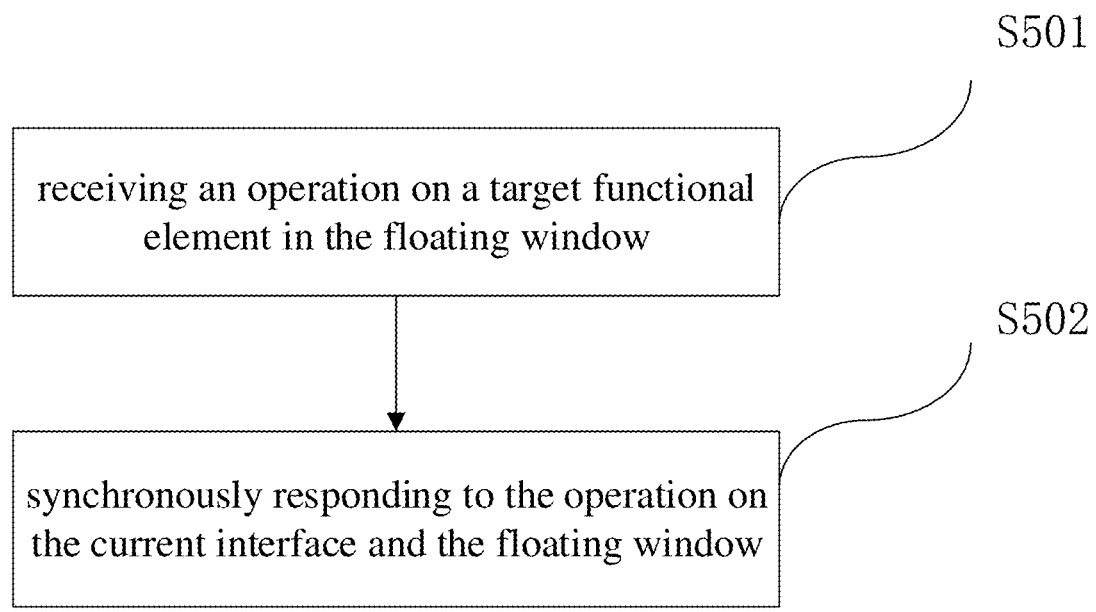
FIG. 14 is an example schematic diagram of a terminal interface according to another embodiment.

According to some embodiments, please refer to FIG. 14, which provides a schematic flowchart of an interface operation method for an embodiment of this disclosure. As shown in FIG. 14, the method of the embodiment of the present disclosure is illustrated. At block S501, the terminal receives an operation on the target functional element in the floating window. At block S502, the terminal synchronously responds to the operation on the current interface and the floating window.

It is easy to understand that operations include, but are not limited to, single-click, double-click, and so on. For example, the operation is a click. When the user clicks the target functional element on the floating window, the terminal can synchronously respond to the operation instruction on the current interface and the floating window. Here, the current interface represents the primary full screen interface.

Optionally, when the user clicks the search functional element on the floating window, the terminal may respond to the operation on the floating window and display the search interface, and at the same time, the terminal may also respond to the operation on the current interface and display the search interface. It is understandable that when the terminal responds to the operation on the floating window, the terminal may also not respond to the search operation instruction on the currently displayed interface.

According to some embodiments, the interface operation method further includes that the terminal may close the floating window after receiving a close operation. For example, after the terminal responds to the operation, the terminal may receive a close operation for the floating window. When the terminal receives the close operation, the terminal can close the floating window.

At block S205, the terminal receives a zooming operation for the mirrored interaction area.

According to some embodiments, when the terminal mirrors the interaction area, the user can adjust the mirror position of the interaction area or the size of the mirror area. At this time, the user can input zoom operation in the mirrored function area. The terminal detects that the user inputs a zoom operation in the mirrored interaction area, the zoom operation includes, but is not limited to, a zoom-out operation, a zoom-in operation, or a position movement operation, etc.

At block S206, the terminal adjusts the interaction area according to a second ratio corresponding to the zooming operation.

According to some embodiments, when the terminal receives a zoom operation for the mirrored interaction area, the terminal may adjust the interaction area according to the zoom ratio corresponding to the zoom operation, so as to further improve the convenience of the user's one-handed operation.

It is easy to understand that, for example, the user can click on the mirrored interaction area, and when the terminal detects that the user clicks on the mirrored interaction area, the terminal can display a zoom cursor or move the cursor around the mirrored interaction area. The user can use a finger (for example, a thumb) to press and move the zoom cursor. When the terminal detects that the user moves the cursor, the terminal can receive the user's zooming instruction for the mirrored interaction area, and the terminal can adjust the mirrored interaction area based on the movement distance of the cursor.

The embodiment of the application provides an interface operation method. When the terminal receives a pressing operation input in the target touch area of the touch screen, the terminal can mirror a zoomed interaction area at the pressing position when a pressing pressure value corresponding to the pressing operation is greater than the pressure threshold, which can reduce the misoperation of the terminal. In addition, in the single-handed operation mode, the terminal can also zoom in and out of the interaction area without the user needing to adjust the position of the terminal in the hand, which simplifies the user's operation process of the functional elements, thereby improving the convenience of the user's one-handed operation.

Figure 15:
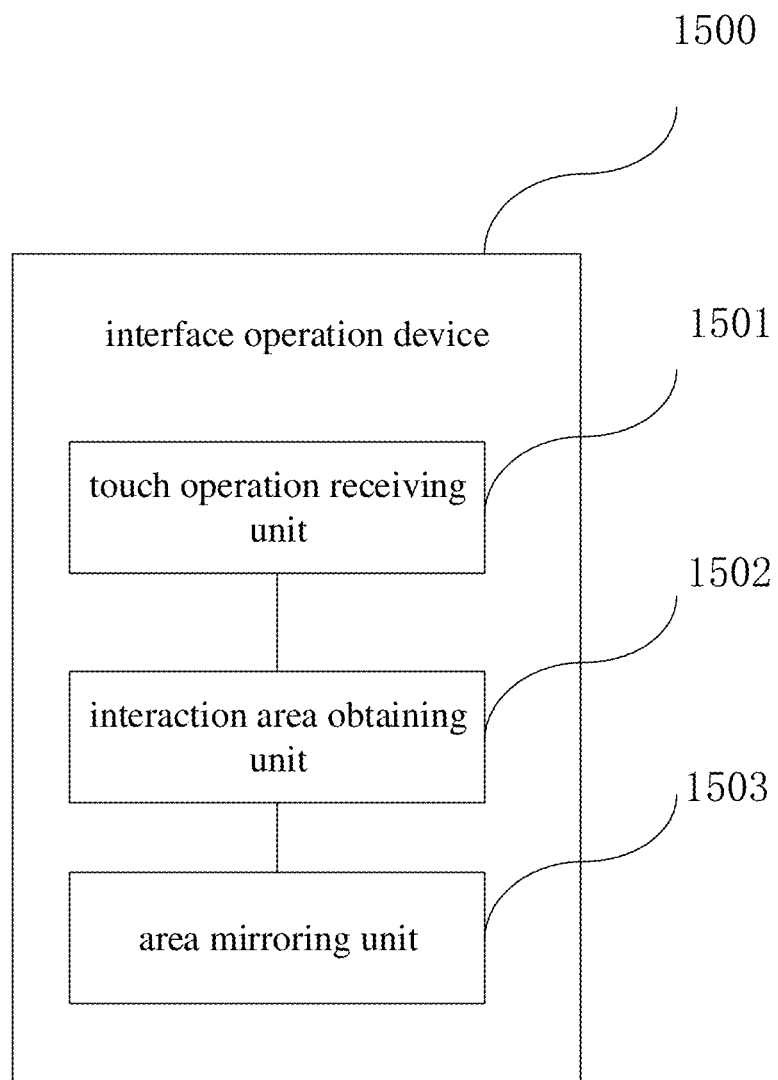
FIG. 15 is a schematic structural diagram of an interface operation device according to an embodiment.

The interface operation device provided by the embodiment of the present disclosure will be described in detail below with reference to FIG. 15. It should be noted that the interface operation device shown in FIG. 15 is used to execute the method of the embodiment shown in FIG. 3 to FIG. 14 of the present disclosure. For ease of description, only the parts related to the embodiment of the present disclosure are shown. For technical details that are not disclosed, please refer to the embodiments shown in FIG. 3 to FIG. 14 of this application.

Please refer to FIG. 15, which is a schematic structural diagram of an interface operation device according to an embodiment of the present disclosure. The interface operation device 1500 can be implemented as all or a part of the user terminal through software, hardware, or a combination of the two. According to some embodiments, the interface operation device 1500 includes a touch operation receiving unit 1501, an interaction area obtaining unit 1502, and an area mirroring unit 1503.

The touch operation receiving unit 1501 is configured to receive a touch operation in a target touch area of the touch display screen; and further to obtain a touch position corresponding to the touch operation.

The interaction area acquiring unit 1502 is configured to acquire an interaction area with at least one target functional element in a current interface, wherein the interaction area is an area of the touch display screen outside the target touch area.

The area mirroring unit 1503 is used to mirror the interaction area at the target touch area in the current interface.

According to some embodiments, when the interaction area acquiring unit 1502 is configured to acquire the interaction area, it is specifically configured to: determine the interaction area comprising at least one functional element on the current interface; use the first shape to mirror the interaction area.

According to some embodiments, the area mirroring unit 1503 is configured to mirror the interaction area at the target touch area, specifically: scale the interaction area according to the preset ratio; mirror the scaled interaction area at the target touch area.

According to some embodiments, the area mirroring unit 1503 is used for mirroring the scaled interaction area at the touch position, specifically for: determining the one-handed mode based on the touch position; when the single-handed mode is the left-handed mode, adopt the first mirroring method to mirror the zoomed interaction area at the touch position; or when the single-handed mode is the right-handed mode, the second mirroring method is adopted to mirror the zoomed interaction area at the touch position.

According to some embodiments, the area mirroring unit 1503 is configured to mirror the interaction area, specifically: mirror the interaction area at the target touch area; receive operation for the interaction area, and respond to the operation synchronously in the current interface and the mirrored interaction area.

According to some embodiments, the area mirroring unit 1503 is configured to mirror the interaction area target touch area, specifically: generate a floating window at the target touch area; mirror the interaction area on the floating window.

According to some embodiments, the interface operation device 1500 further includes an operation response unit 1504, configured to receive an operation for the target functional element on the floating window after mirroring the interaction area on the floating window; simultaneously respond to operation on the current interface and floating windows.

According to some embodiments, the touch operation is a pressing operation, and when the touch operation receiving unit 1501 is further used to obtain the touch position corresponding to the touch operation, it is specifically used for: obtaining a pressing pressure value corresponding to the pressing operation. When the pressing pressure value is greater than the pressure threshold, the touch position corresponding to the pressing operation is acquired.

According to some embodiments, the interface operation device 1500 further includes an area adjustment unit 1505. The area adjustment unit 1505 is configured to receive a zoom operation for the mirrored interaction area after mirrors the interaction area; adjust the interaction area according to the zoom ratio corresponding to the zoom operation.

The embodiment of the present disclosure provides an interface operation device. When the interface operation device receives a touch operation input by the user in the target touch area of the touch screen, it can mirror the interaction area including at least one functional element at the target touch area, so that the user can operate the functional elements in the interaction area at the touch position. Therefore, in the one-handed operation mode, the user can directly operate the functional elements in the interaction area mirrored at the target touch area. There is no need to change the proportion of the interface currently displayed on the touch screen, and the user does not need to frequently change the interface operation device in the palm of the hand. The location can reduce the user's influence on the original experience, thereby improving the user's experience.

Figure 16:
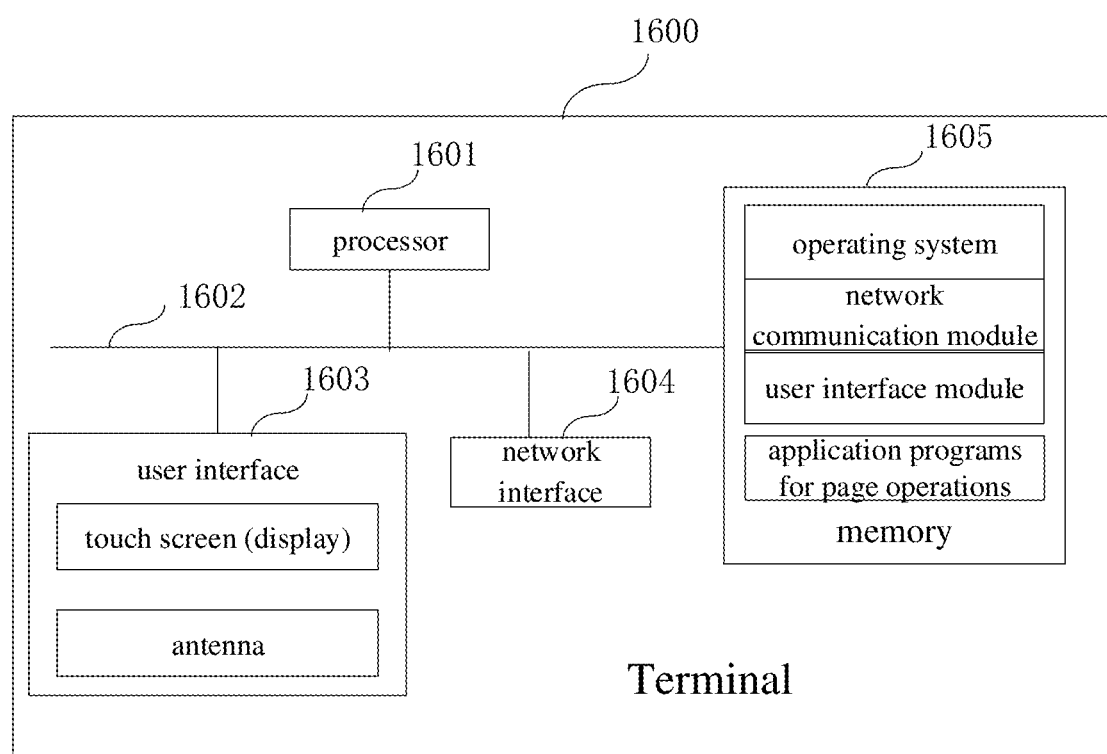
FIG. 16 is a schematic structural diagram of a terminal according to an embodiment.

Refer to FIG. 16, which is a schematic structural diagram of a terminal provided in an embodiment of this application. As shown in FIG. 16, the terminal 1600 may include: at least one processor 1601, at least one network interface 1604, a user interface 1603, a memory 1605, and at least one communication bus 1602.

Among them, the communication bus 1602 is used to implement connection and communication between these components.

The user interface 1603 may include a touch screen (Display) and an antenna, and the optional user interface 1603 may also include a standard wired interface and a wireless interface.

Among them, the network interface 1604 may optionally include a standard wired interface and a wireless interface (such as a WI-FI interface).

The processor 1601 may include one or more processing cores. The processor 1601 uses various excuses and lines to connect various parts of the entire terminal 1600, and executes the terminal by running or executing instructions, programs, code sets, or instruction sets stored in the memory 1605, and calling data stored in the memory 1605, to execute various functions and data processing of terminal 1600. Optionally, the processor 1601 may use at least one of Digital Signal Processing (DSP), Field-Programmable Gate Array (FPGA), and Programmable Logic Array (PLA) A kind of hardware form to realize. The processor 1601 may be integrated with one or a combination of a central processing unit (Central Processing Unit, CPU), an image processor (Graphics Processing Unit, GPU), and a modem. Among them, the CPU mainly processes the operating system, user interface, and application programs; the GPU is used to render and draw the content that needs to be displayed on the display; the modem is used to process wireless communication. It is understandable that the above-mentioned modem may not be integrated into the processor 1601, but may be implemented by a chip alone.

The memory 1605 may include random access memory (Random Access Memory, RAM), or may include read-only memory (Read-Only Memory). Optionally, the memory 1605 includes a non-transitory computer-readable storage medium (non-transitory computer-readable storage medium). The memory 1605 may be used to store instructions, programs, codes, code sets, or instruction sets. The memory 1605 may include a storage program area and a storage data area, where the storage program area may store instructions for implementing the operating system and instructions for at least one function (such as touch function, sound playback function, image playback function, etc.), The instructions used to implement the above method embodiments, etc.; the storage data area can store the data involved in the above method embodiments, etc. Optionally, the memory 1605 may also be at least one storage device located far away from the aforementioned processor 1601.

As shown in FIG. 16, the memory 1605, which is a computer storage medium, may include an operating system, a network communication module, a user interface module, and application programs for interface operations.

In the terminal 1600 shown in FIG. 16, the user interface 1603 is mainly used to provide an input interface for the user to obtain data input by the user; and the processor 1601 may be used to call the interface operation application program stored in the memory 1605, and specifically do the following: receive a touch operation in a target touch area of the touch display screen; acquire an interaction area with at least one target functional element in a current interface, wherein the interaction area is an area of the touch display screen outside the target touch area; and mirror the interaction area at the target touch area in the current interface.

According to some embodiments, when the processor 1601 is configured to obtain the interaction area with at least one target functional element in a current interface, it is specifically configured to execute the following steps: determine the interaction area comprising at least one functional element on the currently displayed interface; use a first shape to mirror the interaction area.

According to some embodiments, the processor 1601 is configured to perform the following steps when mirroring the interaction area at the target touch area: scale the interaction area according to the preset ratio; mirror the scaled interaction area at the target touch area.

According to some embodiments, the processor 1601 is configured to perform the following steps when mirroring the zoomed interaction area at the target touch area: determine the one-handed mode based on the touch position; when the single-handed mode is the left-handed mode, adopt the first mirroring method to mirror the zoomed interaction area at the target touch area; or when the single-handed mode is the right-handed mode, the second mirroring method is adopted to mirror the zoomed interaction area at the target touch area.

According to some embodiments, the processor 1601 is configured to perform the following steps when mirroring the interaction area: mirror the interaction area at the target touch area; receive operation for the interaction area, and respond to the operation synchronously in the current interface and the mirrored interaction area.

According to some embodiments, the processor 1601 is configured to perform the following steps when mirroring the interaction area: generate floating windows at the target touch area; mirror the interaction area on the floating window.

According to some embodiments, after the processor 1601 is configured to mirror the interaction area on the floating window, it is further specifically configured to perform the following steps: receive operation for the target functional element on the floating window; simultaneously respond to operation on the current interface and floating windows.

According to some embodiments, the processor 1601 is configured to perform the following when the touch operation is a pressing operation: obtain a pressing pressure value corresponding to the pressing operation; when the pressing pressure value is greater than the pressure threshold, the touch position corresponding to the pressing operation is acquired;

mirror the interaction area at the touch position.

According to some embodiments, the processor 1601 is configured to perform the following after mirroring the interaction area at the target touch area: receive zoom operation for the mirrored interaction area; adjust the interaction area according to the zoom ratio corresponding to the zoom operation.

The embodiment of the present disclosure provides a terminal. When the terminal receives a touch operation input by the user in the target touch area of the touch display screen, it can mirror the interaction area where the functional element is located at the target touch area corresponding to the touch operation, so that the user can touch the functional elements of the interaction area. Therefore, in the single-handed operation mode, the user can complete the interaction process with the terminal without changing the position of the terminal in the palm of the hand, so the interaction between the user and the terminal can be improved, and the user experience can be improved.

The present disclosure also provides a computer-readable storage medium on which a computer program is stored, and when the program is executed by a processor, the steps of the above method are realized. The computer-readable storage medium may include, but is not limited to, any type of disk, including floppy disks, optical disks, DVDs, CD-ROMs, micro drives, and magneto-optical disks, ROM, RAM, EPROM, EEPROM, DRAM, VRAM, flash memory devices, Magnetic or optical cards, nano-systems (including molecular memory ICs), or any type of media or equipment suitable for storing instructions and/or data.

The embodiments of the present disclosure also provide a computer program product. The computer program product includes a non-transitory computer-readable storage medium storing a computer program. The computer program is operable to cause a computer to execute any of the methods described in the above-mentioned method embodiments. Part or all of the steps of the interface operation method.

Those skilled in the art can clearly understand that the technical solution of the present disclosure can be implemented by means of software and/or hardware. The "unit" and "module" in this specification refer to software and/or hardware that can independently complete or cooperate with other components to complete specific functions. The hardware may be a Field-Programmable Gate Array (FPGA), for example, Integrated Circuit (IC), etc.

It should be noted that for the foregoing method embodiments, for the sake of simple description, they are all expressed as a series of action combinations, but those skilled in the art should know that this application is not limited by the described sequence of actions. Because according to this application, some steps can be performed in other order or at the same time. Secondly, those skilled in the art should also know that the embodiments described in the specification are all preferred embodiments, and the actions and modules involved are not necessarily required by this application.

In the above-mentioned embodiments, the description of each embodiment has its own emphasis. For parts that are not described in detail in an embodiment, reference may be made to related descriptions of other embodiments.

In the several embodiments provided in this application, it should be understood that the disclosed device may be implemented in other ways. For example, the device embodiments described above are merely illustrative. For example, the division of the units is only a logical function division, and there may be other divisions in actual implementation, for example, multiple units or components may be combined or may be Integrate into another system, or some features can be ignored or not implemented. In addition, the displayed or discussed mutual couplings or direct couplings or communication connections may be indirect couplings or communication connections through some service interfaces, devices or units, and may be in electrical or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

In addition, the functional units in the various embodiments of the present disclosure may be integrated into one processing unit, or each unit may exist alone physically, or two or more units may be integrated into one unit. The above-mentioned integrated unit can be implemented in the form of hardware or software functional unit.

If the integrated unit is implemented in the form of a software functional unit and sold or used as an independent product, it can be stored in a computer readable memory. Based on this understanding, the technical solution of the present disclosure essentially or the part that contributes to the existing technology or all or part of the technical solution can be embodied in the form of a software product, and the computer software product is stored in a memory. It includes several instructions to make a computer device (which may be a personal computer, a server, or a network device, etc.) execute all or part of the steps of the methods described in the various embodiments of the present disclosure. The aforementioned memory includes: U disk, read-only memory (Read-Only Memory, ROM), random access memory (Random Access Memory, RAM), mobile hard disk, magnetic disk, or optical disk, and other media that can store program codes.

Those of ordinary skill in the art can understand that all or part of the steps in the various methods of the above-mentioned embodiments can be completed by instructing relevant hardware through a program. The program can be stored in a computer-readable memory, and the memory can include: flash memory Disk, read-only memory (Read-Only Memory, ROM), random access memory (Random Access Memory, RAM), magnetic disk or optical disk, etc.

The above are only exemplary embodiments of the present disclosure, and the scope of the present disclosure cannot be limited by this. That is, all equivalent changes and modifications made in accordance with the teachings of the present disclosure still fall within the scope of the present disclosure. Those skilled in the art will easily think of other embodiments of the present disclosure after considering the specification and practicing the disclosure herein. This application is intended to cover any variations, uses, or adaptive changes of the present disclosure. These variations, uses, or adaptive changes follow the general principles of the present disclosure and include common knowledge or conventional technical means in the technical field that are not recorded in the present disclosure. The description and the embodiments are only regarded as exemplary, and the scope and spirit of the present disclosure are defined by the claims.

What is claimed is:

1. A terminal device, comprising a processor, a touch display screen, and a memory for storing program instructions, the processor being configured to execute the program instructions and configured to cause the terminal device to:
   receive a touch operation at an edge area of the touch display screen;
   define an area of the touch operation as a target touch area;

acquire an interaction area with at least one target functional element in a current interface based on the location of the touch operation, wherein the interaction area is an area of the touch display screen outside the target touch area, wherein the interaction area is located far away from the location of the touch operation; and mirror the interaction area at the target touch area in the current interface without changing the proportion of display content of the interaction area on the touch display screen, wherein a sliding bar is set in a mirroring area corresponding to the location of the touch operation when the at least one target functional element of the interaction area cannot be all displayed in the mirroring area.

2. The terminal device according to claim 1, wherein the processor is further configured to cause the terminal device to:

mirror the interaction area at the target touch area in the current interface, using a first shape.

3. The terminal device according to claim 1, wherein the processor is further configured to cause the terminal device to:

acquire a touch position of the touch operation;
determine a single-handed mode based on the touch position;
when the single-handed mode is a left-handed mode, adopt a first mirroring mode to mirror the interaction area at the target touch area in the current interface; and
when the single-handed mode is a right-handed mode, adapt a second mirroring mode to mirror the interaction area at the target touch area in the current interface.

4. The terminal device according to claim 1, wherein the processor is further configured to cause the terminal device to:

receive an operation in the mirrored interaction area, and synchronously respond to the operation on the current interface and the mirrored interaction area.

5. The terminal device according to claim 1, wherein the processor is further configured to cause the terminal device to:

generate a floating window at the target touch area; and
mirror the interaction area in the floating window.

6. The terminal device according to claim 5, wherein the processor is further configured to cause the terminal device to:

receive an operation for target functional element in the floating window; and
synchronously respond to the operation on the current interface and the floating window.

7. The terminal device according to claim 5, wherein the processor is further configured to cause the terminal device to:

close the floating window in response to receive a close operation on the floating window.

8. The terminal device according to claim 1, wherein the processor is further configured to cause the terminal device to:

acquire a pressing pressure value corresponding to a pressing operation;
when the pressing pressure value beyond a pressure threshold, an area of the pressing operation is defined as the target touch area.

9. The terminal device according to claim 1, wherein the processor is further configured to cause the terminal device to:

receive a zooming operation for the mirrored interaction area; and adjust the mirrored interaction area according to a zoom ratio corresponding to the zoom operation.

10. The method according to claim 1, wherein after mirroring the interaction area at the target touch area in the current interface, the method further comprises:

receiving a zooming operation for the mirrored interaction area; and
adjusting the mirrored interaction area according to a zoom ratio corresponding to the zoom operation.

11. A method for interface operation, applicable to a mobile terminal having a touch display screen, the method comprising:

receiving a touch operation at an edge area of the touch display screen;
defining an area of the touch operation as a target touch area;
acquiring an interaction area with at least one target functional element in a current interface based on the location of the touch operation, wherein the interaction area is an area of the touch display screen outside the target touch area, wherein the interaction area is located far away from the location of the touch operation; and
mirroring the interaction area at the target touch area in the current interface without changing the proportion of display content of the interaction area on the touch display screen, wherein a sliding bar is set in a mirroring area corresponding to the location of the touch operation when the at least one target functional element of the interaction area cannot be all displayed in the mirroring area.

12. The method according to claim 11, wherein mirroring the interaction area at the target touch area in the current interface comprises:

mirroring the interaction area at the target touch area in the current interface, using a first shape.

13. The method according to claim 11, wherein mirroring the zoomed interaction area at the target touch area in the current interface comprises:

acquiring a touch position of the touch operation;
determining a single-handed mode based on the touch position;
when the single-handed mode is a left-handed mode, adopting a first mirroring mode to mirror the interaction area at the target touch area in the current interface; and
when the single-handed mode is a right-handed mode, adapting a second mirroring mode to mirror the interaction area at the target touch area in the current interface.

14. The method according to claim 11, further comprises:

receiving an operation in the mirrored interaction area, and synchronously responding to the operation on the current interface and the mirrored interaction area.

15. The method according to claim 11, wherein mirroring the interaction area at the target touch area in the current interface comprises:

generating a floating window at the target touch area; and
mirroring the interaction area in the floating window.

16. The method according to claim 15, wherein after mirroring the interaction area in the floating window, the method further comprises:

receiving an operation for target functional element in the floating window; and
synchronously responding to the operation on the current interface and the floating window.

17. A non-transitory computer-readable storage medium, having a computer program stored therein, wherein an interface operation method applied to a terminal is performed when the computer program is executed by a processor, and the method comprises:

receiving a touch operation at an edge area of the touch display screen;

defining an area of the touch operation as a target touch area;

acquiring an interaction area with at least one target functional element in a current interface based on the location of the touch operation, wherein the interaction area is an area of the touch display screen outside the target touch area, wherein the interaction area is located far away from the location of the touch operation; and mirroring the interaction area at the target touch area in the current interface without changing the proportion of display content of the interaction area on the touch display screen, wherein a sliding bar is set in a mirroring area corresponding to the location of the touch operation when the at least one target functional element of the interaction area cannot be all displayed in the mirroring area.

* * * * *